(12) United States Patent
Jeung

(10) Patent No.: US 6,873,829 B2
(45) Date of Patent: Mar. 29, 2005

(54) APPARATUS AND METHOD FOR GENERATING PERIODIC BEACON SIGNALS FOR USE IN CDMA BASE STATION

(75) Inventor: Ha Jae Jeung, Namjangju-shi (KR)

(73) Assignee: SK Telecom Co., Ltd., Seoul (KR)

( * ) Notice: Subject to any disclaimer, the term of this patent is extended or adjusted under 35 U.S.C. 154(b) by 448 days.

(21) Appl. No.: 10/183,436

(22) Filed: Jun. 28, 2002

(65) Prior Publication Data

US 2004/0001585 A1 Jan. 1, 2004

Related U.S. Application Data

(63) Continuation of application No. 09/222,735, filed on Dec. 29, 1998, now abandoned.

(30) Foreign Application Priority Data

Dec. 29, 1997 (KR) ............................................. 97-77217

(51) Int. Cl.$^7$ ............................ H01Q 11/12; H04B 1/38
(52) U.S. Cl. ...................... 455/118; 455/436; 455/561; 370/331; 370/342; 370/500
(58) Field of Search ........................... 455/73, 118, 436, 455/561; 370/310, 331, 335, 342, 479, 491, 498, 500, 503; 375/354, 362

(56) References Cited

U.S. PATENT DOCUMENTS

| | | | |
|---|---|---|---|
| 5,613,204 A | 3/1997 | Habermann et al. | |
| 5,930,710 A | 7/1999 | Sawyer et al. | |
| 5,943,329 A | 8/1999 | Ohgoshi et al. | |
| 5,966,377 A | 10/1999 | Murai | |
| 6,035,197 A | 3/2000 | Haberman et al. | |
| 6,078,571 A | * 6/2000 | Hall | ............................ 370/331 |
| 6,173,005 B1 | 1/2001 | Kotzin et al. | |
| 6,226,317 B1 | 5/2001 | Bruckert et al. | |
| 6,438,117 B1 | * 8/2002 | Grilli et al. | .................. 370/331 |

FOREIGN PATENT DOCUMENTS

| | | | | |
|---|---|---|---|---|
| JP | 11262045 A | * 9/1999 | ............ H04Q/7/22 |
| WO | WO 97/31503 | 8/1997 | |

* cited by examiner

*Primary Examiner*—Quochien B. Vuong
(74) *Attorney, Agent, or Firm*—Lowe Hauptman & Berner, LLP

(57) ABSTRACT

An apparatus for generating a plurality of beacon signals for use in a code division multiple access (CDMA) base station includes: a level controller for controlling a level of each of a plurality of transmit intermediate frequency (TxIF) signals based on a level control signal, thereby generating level-controlled TxIF signals; a frequency converter for converting a frequency of each of the level-controlled TxIF signals received from the level controller based on a frequency control signal, thereby generating a beacon transmit radio frequency (TxRF) signal time-divisionally; a time division controller for generating the level control signal and the frequency control signal based on a system synchronization signal and predetermined control information; and a control information storing unit for storing the predetermined control information.

11 Claims, 4 Drawing Sheets

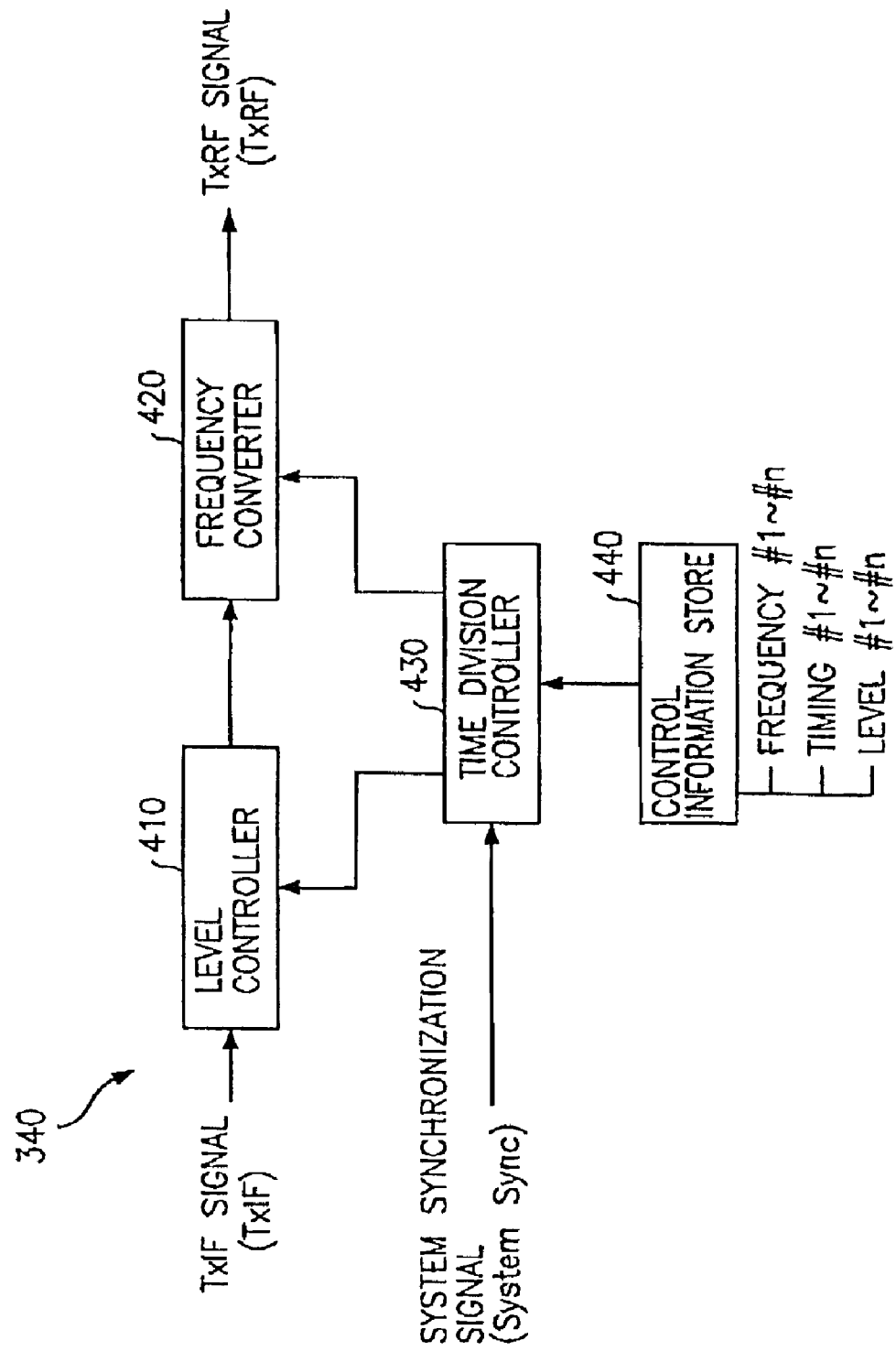

APPARATUS AND METHOD FOR GENERATING PERIODIC BEACON SIGNALS FOR USE IN CDMA BASE STATION

CROSS REFERENCE TO RELATED APPLICATIONS

The present application is a continuation of U.S. patent application Ser. No. 09/222,735, filed Dec. 29, 1998, now abandoned, of which the applicant has claimed and requested a foreign priority, through Paris Convention, based on a patent application filed in the Republic of Korea (South Korea) with the filing date of Dec. 29, 1997, and Korean Application No. 1997-77217.

FIELD OF THE INVENTION

The present invention relates to a code division multiple access (CDMA) base station; and, more particularly, to an apparatus and method for generating a beacon signal time-divisionally used for hand-off between base stations.

BACKGROUND OF THE INVENTION

FIG. 1, shows a conventional code division multiple access (CDMA) base station system which comprises a digital channel signal modulation circuit 110, a modulated signal combination circuit 120, a CDMA bandwidth modulation circuit 130, a radio frequency (RF) converting circuit 140, an output amplifying circuit 150 and a band-pass-filtering circuit 160.

The RF converting circuit 140 includes an up-converter (not shown) and the output amplifying circuit 150 includes a high-power amplifier (not shown). At the digital channel signal modulation circuit 110, a digital CDMA signal is multiplied by an assigned Walsh code to generate a modulated signal. At the modulated signal combination circuit 120, the modulated digital CDMA signal from the digital channel signal modulation circuit 110 is combined with other signals received from other digital channel signal modulation circuits (not shown).

At the CDMA bandwidth modulation circuit 130, the combined signal from the modulation signal combination circuit 120 is modulated by multiplying by a pseudo noise code to generate a CDMA transmit intermediate frequency (TxIF) signal. The up-converter (not shown) of the RF converting circuit 140 converts the frequency of the TxIF signal to radio frequency to generate a transmit radio frequency (TxRF) signal.

The TxRF signal is amplified at the output amplifying circuit 150 and then filtered by using an assigned bandwidth at the band-pass-filtering circuit 160.

On the other hand, call-drop occurs frequently when an ordinary base station having a plurality of frequency assignments (FA's) is adjacently aligned to the smaller base station having single FA or fewer FA than the ordinary base station. Hand-off is provided when a caller moves between the FA of the ordinary base station and the FA of the smaller base station, if both FA's are commonly available within coverage of the ordinary base station and the smaller base station. However, call-drop occurs when the caller moves between the FA of the ordinary base station and the FA of the smaller base station, if the FA of the ordinary base station is not available within the coverage of the smaller base station.

In order to prevent the call-drop, a multiple number of beacon signals are transmitted, with predetermined hand-off parameters to induce the hand-off procedure. Each of the beacon signals is transmitted from the base station into the area which is similar to the traffic FA, the FA for each of the beacon signals being available within the adjacent base station of the smaller base station.

FIG. 2 is a block diagram of a conventional beacon operating apparatus 200 used in the CDMA base station. In FIG. 2, the digital channel signal modulation circuit 110, the modulated signal combination circuit 130 and the CDMA bandwidth modulation circuit 120 are combined into one of a CDMA modulation circuit for the traffic FA (or a traffic FA CDMA modulation circuit) 210 and a CDMA modulation circuit for the beacon FA (or a beacon FA CDMA modulation circuit) 220. The traffic FA CDMA modulation circuit 210 is dedicated to traffic FA and connected to the frequency converting circuit 230. The beacon FA CDMA modulation circuit 220 includes N beacon FA modulation circuits 220-1 to 220-N, N being a positive integer and identical to required number of operated beacon signals.

As shown in FIG. 2, each of the beacon FA modulation circuits 220-1 to 220-N is connected to one of its corresponding one of frequency converting circuits 240-1 to 240-N as shown by one of dashed lines and the traffic FA modulation circuit 210 as shown by a solid line.

The N beacon signals are continuously generated and combined with the traffic signal from the frequency converting circuit 230 at the frequency combining circuit 250 to be applied to the output amplifying circuit 150.

However, in the conventional beacon signal operation as described above, the N number of frequency converting circuits 240-1 to 240-N are included in the beacon operating apparatus 200 and each of the frequency converting circuits 240-1 to 240-N generates its corresponding beacon signal continuously. Since the continuously generated beacon signals increase load at the output end, it is required the N up-converters and the high power amplifier or liner power amplifier to sustain the N beacon signals. Since the continuously generated beacon signals increase forward noise during hand-off procedure after the beacon signal acquisition of a caller's terminal, hand-off success rate is decreased.

SUMMARY OF THE INVENTION

It is, therefore, a primary object of the present invention to provide a beacon signal generating apparatus, for use in a CDMA base station, capable of economizing facilities, minimizing load at the output end and improving hand-off success rate by generating a beacon signal time-divisionally.

Another object of the present invention is to provide a beacon signal generating method, for use in a CDMA base station, capable of reducing forward noise by transmitting a beacon signal time-divisionally.

In accordance with one aspect of the present invention, there is provided an apparatus for generating a plurality of beacon signals for use in a code division multiple access (CDMA) base station, including: level controlling means for controlling a level of each of a plurality of transmit intermediate frequency (TxIF) signals based on a level control signal, thereby generating level-controlled TxIF signals; frequency converting means for converting a frequency of each of the level-controlled TxIF signals received from the level controlling means based on a frequency control signal, thereby generating a beacon transmit radio frequency (TxRF) signal time-divisionally; timing controlling means for generating the level control signal and the frequency control signal based on a system synchronization signal and predetermined control information; and storing means for storing the predetermined control information.

In accordance with another aspect of the present invention, there is provided A method for generating a plurality of beacon signals for use in a code division multiple access (CDMA) base station, including the steps of: controlling a level of each of a plurality of transmit intermediate frequency (TxIF) signals based on a level control signal to generate a plurality of level-controlled TxIF signals; and converting a frequency of each of the level-controlled TxIF signals based on a frequency control signal to generate beacon transmit radio frequency (TxRF) signals time-divisionally, wherein the level control signal and the frequency control signals are generated based on a system synchronization signal and predetermined control information.

BRIEF DESCRIPTION OF THE DRAWINGS

The above and other objects and features of the present invention will become apparent from the following description of preferred embodiments given in conjunction with the accompanying drawings, in which:

FIG. 4 represents a block diagram of a preferred embodiment of the inventive periodic beacon signal generating apparatus.

DETAILED DESCRIPTION OF THE PREFERRED EMBODIMENTS

Figure 1:
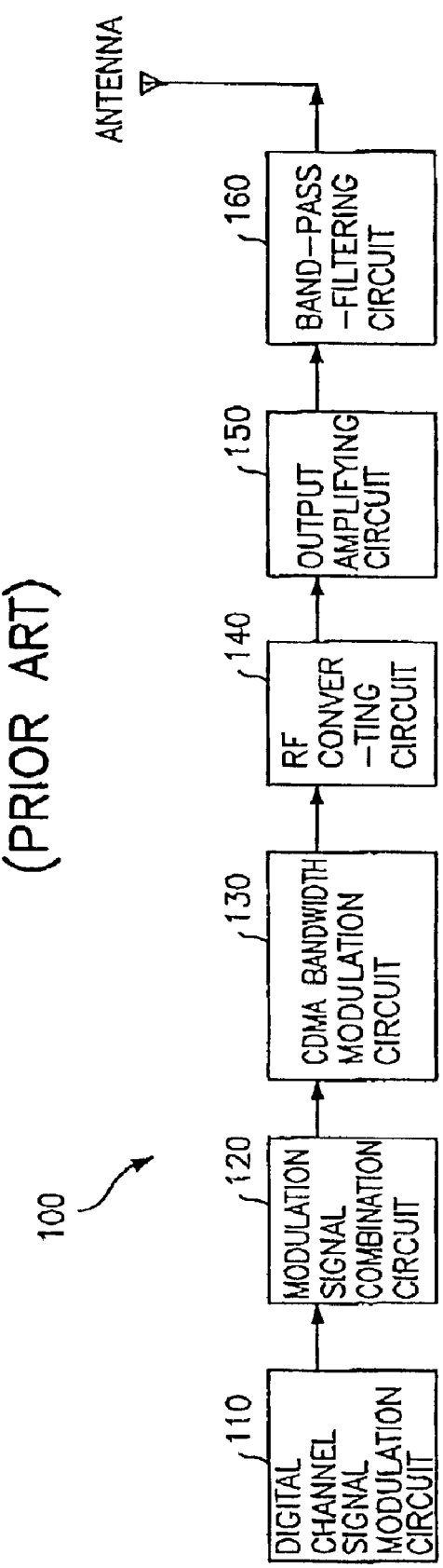
FIG. 1 presents a block diagram of a conventional CDMA base station.
Figure 2:
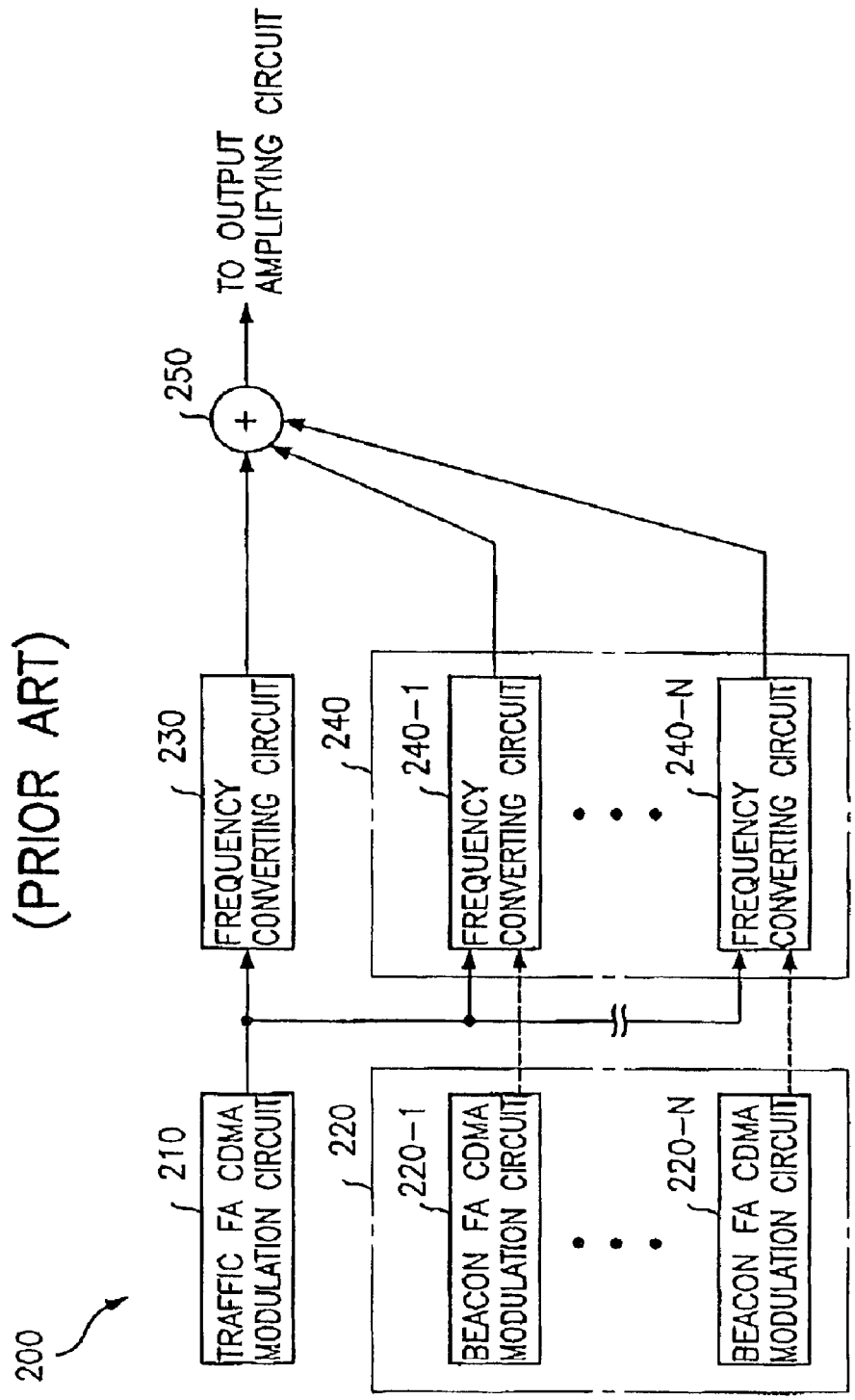
FIG. 2 provides a block diagram of a conventional beacon signal operating apparatus used in the conventional CDMA base station in FIG. 1.
Figure 3:
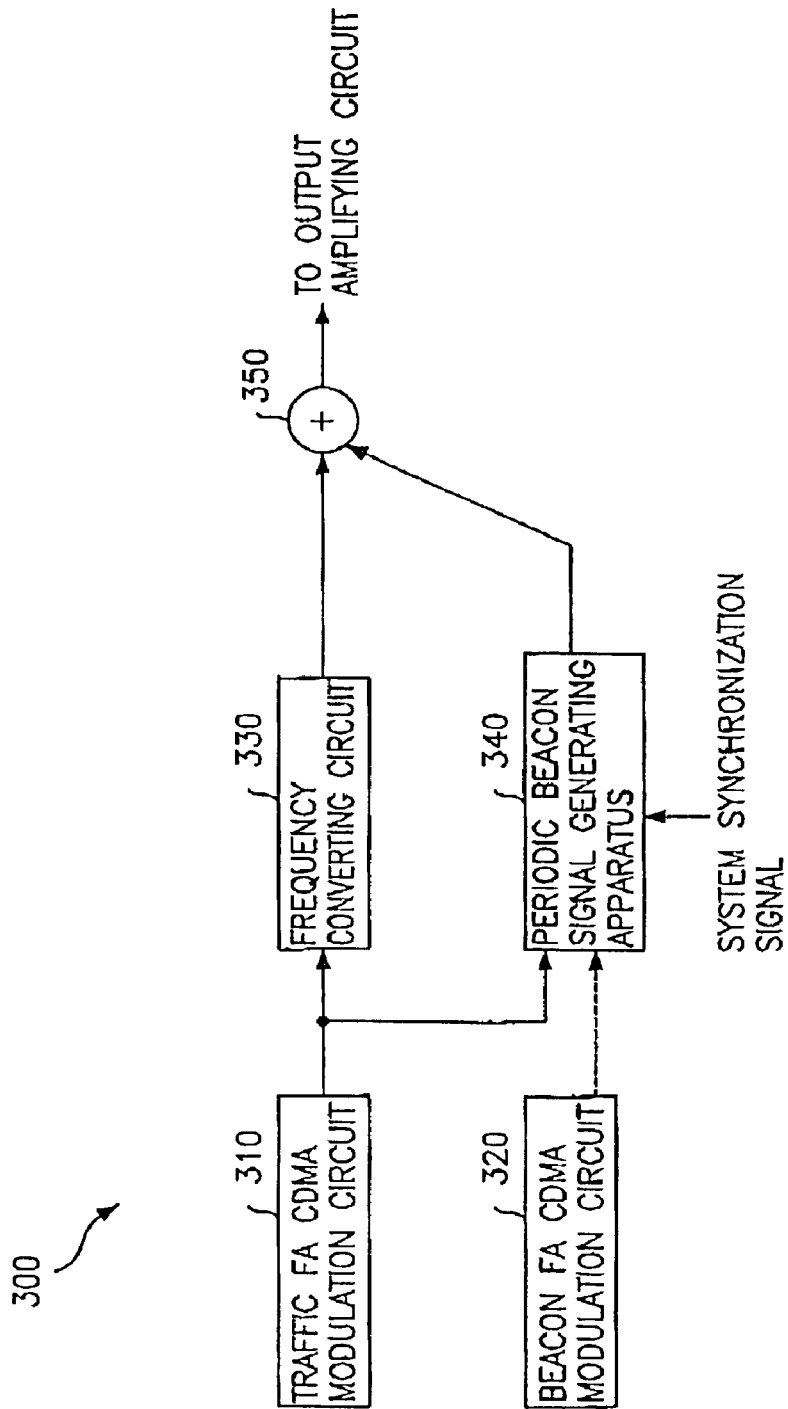
FIG. 3 is a block diagram of a CDMA base station in accordance with the present invention.

Referring to FIG. 3, there is provided a block diagram of a code division multiple access (CDMA) base station 300 in accordance with the present invention.

The CDMA base station 300 comprises a traffic frequency assignment (FA) CDMA modulation circuit 310, a beacon FA CDMA modulation circuit 320, a frequency converting circuit 330, a periodic beacon signal generating apparatus 340 and a radio frequency (RF) combination circuit 350.

Referring to FIG. 3, the CDMA base station 300 in accordance with the present invention includes only one periodic beacon signal generating apparatus 340 and one frequency converting circuit even though a plurality of beacon signals are operated by the CDMA base station 300.

The periodic beacon signal generating apparatus 340 receives a system synchronization signal and a transmit intermediate frequency (TxIF) signal which is applied from one of the traffic FA CDMA modulation circuit 310 and the beacon FA CDMA modulation circuit 320, and generates multiple beacon signals each for a FA time divisionally and synchronizes the multiple beacon signals based on the system synchronization signal received externally. The periodic signal generating apparatus 340 applies each of the multiple beacon signals time-divisionally to the frequency combination circuit 350 to thereby minimize load at output end and forward noise during hand-off. For example, the system synchronization signal is the even second signal of a global positioning system (GPS) signal.

Referring to FIG. 4, there is provided a block diagram of a preferred embodiment of a periodic beacon signal generating apparatus 340 including a level controller 410 for controlling level of the TxIF signal, a frequency converter 420 for converting the frequency of the TxIF signal to a radio frequency to transmit radio frequency (TxRF) signal, a time division controller 430 for controlling the level controller 410 and the frequency converter 420 based on the system synchronization signal, and a control information store 440 for storing an operation frequency, on/off timing and a signal level for each of the beacon signals.

Referring to FIG. 4, the TxIF signal is applied to the level controller 410 from one of the traffic FA CDMA modulation circuit 310 and the beacon FA CDMA modulation circuit 320. In the preferred embodiment of the invention for a cellular system, the TxIF signal has 1.23 MHz bandwidth in 800 MHz band CDMA system, 4.95 MHz center frequency and 0 to −20 dBm signal level. The TxIF signal includes information, such as timing information, Walsh code and pseudo noise sequence, required for CDMA communication system.

The level controller 410 controls a level of the applied TxIF signal by amplifying the TxIF signal based on a level control signal from the time division controller 430 and then outputs a level-controlled TxIF signal to the frequency converter 42b. The level control signal is generated based on the signal level that is stored on the control information store 440.

At the frequency converter 420, the frequency 6f the TxIF signal from the level controller 410 is converted to the radio frequency to generate the TxRF signal by using a known scheme, e.g., a phase lock loop (PLL) scheme, according to a frequency control signal from the time division controller 430. The frequency control signal is generated based on the operation frequency stored on the control information store 440. In the preferred embodiment of the invention for the cellular system, the TxRF signal ranges from 869 MHz to 894 MHz.

The time division controller 430 is constructed by a known microprocessor or a digital circuit and controls the level controller 410 and the frequency converter 420 to generate a beacon TxRF signal time-divisionally, based on the information stored at the control information store 440.

The control information store 440 sets and stores the operation frequency, the on/off timing and the signal level, for each of the beacon signals. For example, the operation frequency and the on/off timing are set by and stored on a memory or dual inline package (DIP) switches, and the signal level is set by and stored on a volume switch.

Each of the multiple beacon signals is transmitted time divisionally, i.e., periodically, when the multiple beacon signals are operated for hand-off between the base stations, the traffic FA for each of the base station being different from each other. Therefore, load at output end and forward noise during the hand-off are minimized.

As described above, since the inventive periodic beacon signal generating apparatus 340 for use in the CDMA base station generates each of the multiple beacon signals time-divisionally, it is required single frequency converting circuit, e.g., an up-converter, regardless of the number of beacon signal operations in the CDMA base station. Therefore, facilities are economized and load at the output end is minimized. Also, hand-off success rate is improved since forward noise during the hand-off is minimized.

While the present invention has been shown and described with respect to the particular embodiments, it will be apparent to those skilled in the art that many changes and modifications may be made without departing from the spirit and scope of the invention as defined in the appended claims.

What is claimed is:

1. An apparatus for generating a plurality of beacon signals for use in a code division multiple access (CDMA) base station, comprising:

level controlling means for controlling a level of each of a plurality of transmit intermediate frequency (TxIF) signals based on a level control signal, thereby generating level-controlled TxIF signals;

frequency converting means for converting a frequency of each of the level-controlled TxIF signals received from the level controlling means based on a frequency control signal, thereby generating a beacon transmit radio frequency (TxRF) signal time-divisionally;

timing controlling means for generating the level control signal and the frequency control signal based on a system synchronization signal and predetermined control information; and storing means for storing the predetermined control information.

2. The apparatus of claim 1, wherein each of the TxIF signals is applied to the level controlling means from a beacon signal modulating means included in the CDMA base station.

3. The apparatus of claim 1, wherein each of the TxIF signals is applied to the level controlling means from a traffic signal modulating means included in the CDMA base station.

4. The apparatus of claim 1, wherein the TxIF signal applied to the level converting means has 1.23 MHz bandwidth for 800 MHz band CDMA communications, 495 MHz center frequency and 0 to −20 dbm signal level.

5. The apparatus of claim 1, wherein the predetermined control information includes an operation frequency, on/off timing and a signal level for each of the plurality of beacon TxRF signals.

6. The apparatus of claim 5, wherein the storing means includes:

a plurality of DIP switches, each for setting and storing operation frequency and on/off timing for each of the beacon TxRF signals; and volume switches each for setting and storing the signal level for each of the beacon TxRF signals.

7. The apparatus of claim 1, wherein the system synchronization signal is even second signal of global positioning system (GPS) signal provided externally.

8. A method for generating a plurality of beacon signals for use in a code division multiple access (CDMA) base station, comprising the steps of:

controlling a level of each of a plurality of transmit intermediate frequency (TxIF) signals based on a level control signal to generate a plurality of level-controlled TxIF signals; and converting a frequency of each of the level-controlled TxIF signals based on a frequency control signal to generate beacon transmit radio frequency (TxRF) signals time-divisionally, wherein the level control signal and the frequency control signals are generated based on a system synchronization signal and predetermined control information.

9. The method of claim 8, wherein each of the TxIF signals has 1.23 MHz bandwidth for 800 MHz band CDMA communications, 4.95 MHz center frequency and 0 to −20 dbm signal level.

10. The method of claim 8, wherein the predetermined control information includes an operation frequency, an on/off timing and a signal level for each of the beacon TxRF signals.

11. The method of claim 8, wherein the system synchronization signal is the even second signal of a global positioning system (GPS) signal provided externally.

* * * * *